US008384547B2

(12) United States Patent
Kato

(10) Patent No.: US 8,384,547 B2
(45) Date of Patent: Feb. 26, 2013

(54) WIRELESS IC DEVICE

(75) Inventor: Noboru Kato, Moriyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 81 days.

(21) Appl. No.: 12/211,117

(22) Filed: Sep. 16, 2008

(65) Prior Publication Data

US 2009/0002130 A1 Jan. 1, 2009

Related U.S. Application Data

(63) Continuation of application No. PCT/JP2007/054050, filed on Mar. 2, 2007.

(30) Foreign Application Priority Data

Apr. 10, 2006 (JP) .................................. 2006-107839
May 16, 2006 (JP) .................................. 2006-136243

(51) Int. Cl.
*G08B 13/14* (2006.01)
(52) U.S. Cl. .................. 340/572.7; 340/572.1; 340/10.1
(58) Field of Classification Search ............... 340/572.1, 340/10.1
See application file for complete search history.

(56) References Cited

U.S. PATENT DOCUMENTS

| | | | |
|---|---|---|---|
| 3,364,564 A | 1/1968 | Kurtz et al. | |
| 4,794,397 A | 12/1988 | Ohe et al. | |
| 4,835,524 A * | 5/1989 | Lamond et al. ............ | 340/572.3 |
| 5,053,774 A * | 10/1991 | Schuermann et al. ..... | 340/10.34 |
| 5,232,765 A | 8/1993 | Yano et al. | |
| 5,253,969 A | 10/1993 | Richert | |
| 5,337,063 A | 8/1994 | Takahira | |
| 5,374,937 A | 12/1994 | Tsunekawa et al. | |
| 5,399,060 A | 3/1995 | Richert | |
| 5,491,483 A | 2/1996 | D'Hont | |
| 5,757,074 A | 5/1998 | Matloubian et al. | |
| 5,903,239 A | 5/1999 | Takahashi et al. | |
| 5,936,150 A | 8/1999 | Kobrin et al. | |
| 5,955,723 A | 9/1999 | Reiner | |
| 5,995,006 A | 11/1999 | Walsh | |
| 6,104,311 A | 8/2000 | Lastinger | |

(Continued)

FOREIGN PATENT DOCUMENTS

| | | |
|---|---|---|
| CN | 1243294 A | 2/2000 |
| CN | 1407832 A | 4/2003 |

(Continued)

OTHER PUBLICATIONS

Official Communication issued in International Patent Application No. PCT/JP2007/054050, mailed on Jun. 5, 2007.

(Continued)

*Primary Examiner* — Jennifer Mehmood
*Assistant Examiner* — Ryan Sherwin
(74) *Attorney, Agent, or Firm* — Keating & Bennett, LLP

(57) ABSTRACT

A wireless IC device includes a wireless IC chip having a power supply circuit including a resonant circuit having a predetermined resonant frequency and a radiation plate that externally radiates a transmission signal supplied from the power supply circuit and that supplies a reception signal externally transmitted to the power supply circuit. The radiation plate is connected to the power supply circuit via an electric field or the radiation plate is coupled to the power supply circuit via a magnetic field. The radiation plate is a two-surface-open type radiation plate including at least one radiation portion arranged to externally exchange a transmission-reception signal and a power supply portion arranged to exchange a transmission-reception signal with the power supply circuit.

15 Claims, 12 Drawing Sheets

U.S. PATENT DOCUMENTS

| | | |
|---|---|---|
| 6,107,920 A | 8/2000 | Eberhardt et al. |
| 6,172,608 B1 | 1/2001 | Cole |
| 6,181,287 B1 | 1/2001 | Beigel |
| 6,190,942 B1 | 2/2001 | Wilm et al. |
| 6,259,369 B1 | 7/2001 | Monico |
| 6,271,803 B1 | 8/2001 | Watanabe et al. |
| 6,321,067 B1 * | 11/2001 | Suga et al. .................. 455/41.2 |
| 6,335,686 B1 | 1/2002 | Goff et al. |
| 6,362,784 B1 | 3/2002 | Kane et al. |
| 6,367,143 B1 | 4/2002 | Sugimura |
| 6,378,774 B1 | 4/2002 | Emori et al. |
| 6,406,990 B1 | 6/2002 | Kawai |
| 6,448,874 B1 | 9/2002 | Shiino et al. |
| 6,462,716 B1 | 10/2002 | Kushihi |
| 6,542,050 B1 | 4/2003 | Arai et al. |
| 6,600,459 B2 | 7/2003 | Yokoshima et al. |
| 6,634,564 B2 | 10/2003 | Kuramochi |
| 6,664,645 B2 | 12/2003 | Kawai |
| 6,763,254 B2 | 7/2004 | Nishikawa |
| 6,828,881 B2 | 12/2004 | Mizutani et al. |
| 6,927,738 B2 | 8/2005 | Senba et al. |
| 6,963,729 B2 | 11/2005 | Uozumi |
| 7,088,307 B2 | 8/2006 | Imaizumi |
| 7,112,952 B2 | 9/2006 | Arai et al. |
| 7,119,693 B1 | 10/2006 | Devilbiss |
| 7,129,834 B2 | 10/2006 | Naruse et al. |
| 7,248,221 B2 | 7/2007 | Kai et al. |
| 7,250,910 B2 | 7/2007 | Yoshikawa et al. |
| 7,276,929 B2 | 10/2007 | Arai et al. |
| 7,317,396 B2 | 1/2008 | Ujino |
| 7,405,664 B2 | 7/2008 | Sakama et al. |
| 7,659,892 B2 * | 2/2010 | Tanada et al. ................ 345/211 |
| 2002/0011967 A1 | 1/2002 | Goff et al. |
| 2002/0044092 A1 | 4/2002 | Kushihi |
| 2002/0067316 A1 | 6/2002 | Yokoshima et al. |
| 2002/0162894 A1 | 11/2002 | Kuramochi |
| 2003/0006936 A1 | 1/2003 | Aoyama et al. |
| 2004/0001027 A1 | 1/2004 | Killen et al. |
| 2004/0217915 A1 | 11/2004 | Imaizumi |
| 2004/0219956 A1 | 11/2004 | Iwai et al. |
| 2004/0227673 A1 | 11/2004 | Iwai et al. |
| 2005/0092836 A1 | 5/2005 | Kudo |
| 2005/0099337 A1 | 5/2005 | Takei et al. |
| 2005/0125093 A1 | 6/2005 | Kikuchi et al. |
| 2005/0140512 A1 | 6/2005 | Sakama et al. |
| 2005/0232412 A1 | 10/2005 | Ichihara et al. |
| 2005/0236623 A1 | 10/2005 | Takechi et al. |
| 2005/0275539 A1 | 12/2005 | Sakama et al. |
| 2006/0001138 A1 | 1/2006 | Sakama et al. |
| 2006/0055601 A1 | 3/2006 | Kameda et al. |
| 2006/0071084 A1 | 4/2006 | Detig et al. |
| 2006/0097870 A1 * | 5/2006 | Choi et al. ................ 340/572.1 |
| 2006/0109185 A1 | 5/2006 | Iwai et al. |
| 2006/0158380 A1 | 7/2006 | Son et al. |
| 2006/0267138 A1 | 11/2006 | Kobayashi |
| 2007/0004028 A1 | 1/2007 | Lair et al. |
| 2007/0018893 A1 | 1/2007 | Kai et al. |
| 2007/0040028 A1 | 2/2007 | Kawamata |
| 2007/0052613 A1 | 3/2007 | Gallschuetz et al. |
| 2007/0252700 A1 | 11/2007 | Ishihara et al. |
| 2007/0285335 A1 | 12/2007 | Bungo et al. |
| 2008/0024156 A1 | 1/2008 | Arai et al. |
| 2008/0169905 A1 | 7/2008 | Slatter |
| 2008/0272885 A1 | 11/2008 | Atherton |
| 2009/0002130 A1 | 1/2009 | Kato |

FOREIGN PATENT DOCUMENTS

| | | |
|---|---|---|
| DE | 699 09 301 T2 | 4/2004 |
| EP | 0 977 145 A2 | 2/2000 |
| JP | 50-143451 A | 11/1975 |
| JP | 62-127140 U | 8/1987 |
| JP | 05-327331 A | 12/1993 |
| JP | 6-53733 A | 2/1994 |
| JP | 06-077729 A | 3/1994 |
| JP | 06-177635 A | 6/1994 |
| JP | 07-183836 A | 7/1995 |
| JP | 08-056113 A | 2/1996 |
| JP | 8-87580 A | 4/1996 |
| JP | 11-149537 A | 6/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-245381 A | 9/1997 |
| JP | 09-252217 A | 9/1997 |
| JP | 09-270623 A | 10/1997 |
| JP | 10-505466 A | 5/1998 |
| JP | 10-171954 A | 6/1998 |
| JP | 10-293828 A | 11/1998 |
| JP | 11-149538 A | 6/1999 |
| JP | 11-219420 A | 8/1999 |
| JP | 11-328352 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2005-229474 A | 1/2000 |
| JP | 2000-059260 A | 2/2000 |
| JP | 2000-085283 A | 3/2000 |
| JP | 2000-132643 A | 5/2000 |
| JP | 2000-137778 A | 5/2000 |
| JP | 2000-148948 A | 5/2000 |
| JP | 2000-172812 A | 6/2000 |
| JP | 2000-510271 A | 8/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 2001-028036 A | 1/2001 |
| JP | 2007-18067 A | 1/2001 |
| JP | 2001-66990 A | 3/2001 |
| JP | 2001-168628 A | 6/2001 |
| JP | 2001-256457 A | 9/2001 |
| JP | 2001-514777 A | 9/2001 |
| JP | 2001-319380 A | 11/2001 |
| JP | 2001-331976 A | 11/2001 |
| JP | 2001-332923 A | 11/2001 |
| JP | 2001-344574 A | 12/2001 |
| JP | 2001-351084 A | 12/2001 |
| JP | 2002-024776 A | 1/2002 |
| JP | 2002-042076 A | 2/2002 |
| JP | 2002-505645 A | 2/2002 |
| JP | 2002-76750 A | 3/2002 |
| JP | 2002-150245 A | 5/2002 |
| JP | 2002-175508 A | 6/2002 |
| JP | 2002-183690 A | 6/2002 |
| JP | 2002-185358 A | 6/2002 |
| JP | 2002-204117 A | 7/2002 |
| JP | 2002-230128 A | 8/2002 |
| JP | 2002-298109 A | 10/2002 |
| JP | 2002-319008 A | 10/2002 |
| JP | 2002-362613 A | 12/2002 |
| JP | 2002-373029 A | 12/2002 |
| JP | 2002-373323 A | 12/2002 |
| JP | 2003-016412 A | 1/2003 |
| JP | 2003-030612 A | 1/2003 |
| JP | 2003-44789 A | 2/2003 |
| JP | 2003-58840 A | 2/2003 |
| JP | 2003-067711 A | 3/2003 |
| JP | 2003-076947 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099720 A | 4/2003 |
| JP | 2003-099721 A | 4/2003 |
| JP | 2003-110344 A | 4/2003 |
| JP | 2003-132330 A | 5/2003 |
| JP | 2003-134007 A | 5/2003 |
| JP | 2003-155062 A | 5/2003 |
| JP | 2003-158414 A | 5/2003 |
| JP | 2003-187207 A | 7/2003 |
| JP | 2003-187211 A | 7/2003 |
| JP | 2003-198230 A | 7/2003 |

| | | | |
|---|---|---|---|
| JP | 2003-209421 A | 7/2003 | |
| JP | 2003-218624 A | 7/2003 | |
| JP | 2003-233780 A | 8/2003 | |
| JP | 2003-242471 A | 8/2003 | |
| JP | 2003-243918 A | 8/2003 | |
| JP | 2003-288560 A | 10/2003 | |
| JP | 2003-309418 A | 10/2003 | |
| JP | 2003-332820 A | 11/2003 | |
| JP | 2004-88218 A | 3/2004 | |
| JP | 2004-096566 A | 3/2004 | |
| JP | 2004-253858 A | 9/2004 | |
| JP | 2004-287767 A | 10/2004 | |
| JP | 2004-297249 A | 10/2004 | |
| JP | 2004-326380 A | 11/2004 | |
| JP | 2004-334268 A | 11/2004 | |
| JP | 2004-336250 A | 11/2004 | |
| JP | 2004-343000 A | 12/2004 | |
| JP | 2004-362190 A | 12/2004 | |
| JP | 2004-362341 A | 12/2004 | |
| JP | 2004-362602 A | 12/2004 | |
| JP | 2005-136528 A | 5/2005 | |
| JP | 2005-165839 A | 6/2005 | |
| JP | 2005-167327 A | 6/2005 | |
| JP | 2005-191705 A | 7/2005 | |
| JP | 2005-210676 A | 8/2005 | |
| JP | 2005-210680 A | 8/2005 | |
| JP | 2005-217822 A | 8/2005 | |
| JP | 2005-236339 A | 9/2005 | |
| JP | 2005-244778 A | 9/2005 | |
| JP | 2005-275870 A | 10/2005 | |
| JP | 2005-295135 A | 10/2005 | |
| JP | 2005-311205 A | 11/2005 | |
| JP | 2005-321305 A | 11/2005 | |
| JP | 2005-335755 A | 12/2005 | |
| JP | 2005-346820 A | 12/2005 | |
| JP | 2005-352858 A | 12/2005 | |
| JP | 2006-031766 A | 2/2006 | |
| JP | 2006-39902 A | 2/2006 | |
| JP | 2006-67479 A | 3/2006 | |
| JP | 2006-72706 A | 3/2006 | |
| JP | 2006-80367 A | 3/2006 | |
| JP | 2006-92630 A | 4/2006 | |
| JP | 2006-102953 A | 4/2006 | |
| JP | 2006-148518 A | 6/2006 | |
| JP | 2006-195795 A | 7/2006 | |
| JP | 2006-270212 A | 10/2006 | |
| JP | 2006-309401 A | 11/2006 | |
| JP | 2007-65822 A | 3/2007 | |
| JP | 2007-150868 A | 6/2007 | |
| JP | 11-175678 A | 1/2009 | |
| NL | 9100176 A | 3/1992 | |
| NL | 9100347 A | 3/1992 | |
| WO | 03/079305 A1 | 9/2003 | |
| WO | 2004/036772 A1 | 4/2004 | |
| WO | 2004/070879 A | 8/2004 | |
| WO | 2004/072892 A1 | 8/2004 | |
| WO | 2005/073937 A | 8/2005 | |
| WO | 2005/115849 A1 | 12/2005 | |
| WO | 2006/045682 A | 5/2006 | |

OTHER PUBLICATIONS

Official Communication issued in corresponding German Patent Application No. 11 2007 000 799.0, mailed on Nov. 30, 2009.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device," U.S. Appl. No. 11/624,382, filed Jan. 18, 2007.
Dokai et al.: "Wireless IC Device, and Component for Wireless IC Device," U.S. Appl. No. 11/930,818, filed Oct. 31, 2007.
Kato et al.: "Wireless IC Device," U.S. Appl. No. 12/042,399, filed Mar. 5, 2008.
Official communication issued in related U.S. Appl. No. 12/042,399; mailed on Aug. 25, 2008.
English translation of NL9100176, published on Mar. 2, 1992.
English translation of NL9100347, published on Mar. 2, 1992.
Kato et al.: "Antenna," U.S. Appl. No. 11/928,502, filed Oct. 30, 2007.
Dokai et al.: "Wireless IC Device and Component for Wireless IC Device," U.S. Appl. No. 12/359,690, filed Jan. 26, 2009.
Kato et al.: "Antenna," U.S. Appl. No. 11/688,290, filed Mar. 20, 2007.
Kato et al.: "Electromagnetic-Coupling-Module-Attached Article," U.S. Appl. No. 11/740,509, filed Apr. 26, 2007.
Kato et al.: "Product Including Power Supply Circuit Board," U.S. Appl. No. 12/234,949, filed Sep. 22, 2008.
Kato et al.: "Data Coupler," U.S. Appl. No. 12/252,475, filed Oct. 16, 2008.
Kato et al.; "Information Terminal Device," U.S. Appl. No. 12/267,666, filed Nov. 10, 2008.
Kato et al.: "Wireless IC Device and Wireless IC Device Composite Component," U.S. Appl. No. 12/276,444, filed Nov. 24, 2008.
Dokai et al.: "Optical Disc," U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System," U.S. Appl. No. 12/274,400, filed Nov. 20, 2008.
Kato: "Wireless IC Device," U.S. Appl. No. 11/964,185, filed Dec. 26, 2007.
Kato et al.: "Radio Frequency IC Device," U.S. Appl. No. 12/336,629, filed Dec. 17, 2008.
Kato et al.: "Wireless IC Device and Component for Wireless IC Device," U.S. Appl. No. 12/339,198, filed Dec. 19, 2008.
Ikemoto et al.: "Wireless IC Device," U.S. Appl. No. 11/851,651, filed Sep. 7, 2007.
Kataya et al.: "Wireless IC Device and Electronic Device," U.S. Appl. No. 11/851,661, filed Sep. 7, 2007.
Dokai et al.: "Antenna and Radio IC Device," U.S. Appl. No. 12/350,307, filed Jan. 8, 2009.
Official Communication issued in corresponding Chinese Patent Application No. 200780012497.7, mailed on Aug. 24, 2011.

* cited by examiner

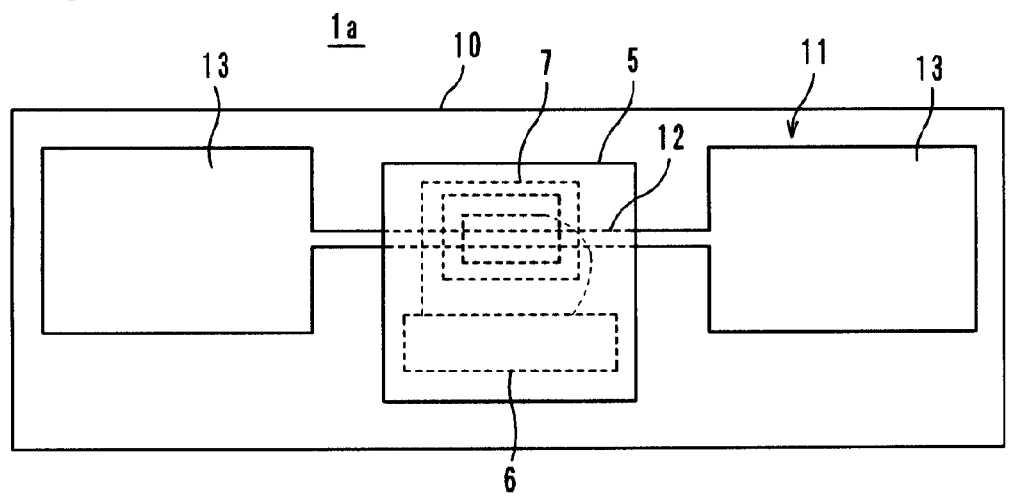
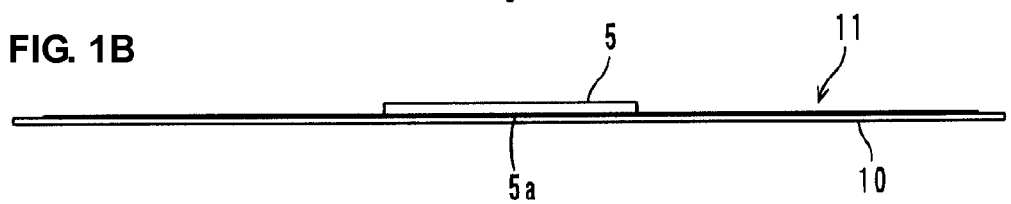
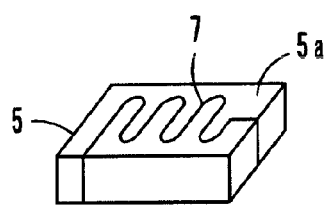
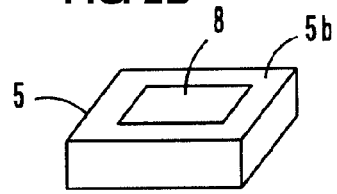

WIRELESS IC DEVICE

BACKGROUND OF THE INVENTION

1. Field of the Invention

The present invention relates to wireless integrated circuit (IC) devices and, more particularly, to a wireless IC device used in a Radio Frequency Identification (RFID) system.

2. Description of the Related Art

RFID systems have been developed as management systems for articles. In the RFID systems, readers-writers that generate induction fields communicate with IC tags (hereinafter referred to as wireless IC devices) that contain information regarding the articles by non-contact methods so as to transmit information. The wireless IC devices used in the RFID systems typically includes wire-wound coils that are formed on substrates on which wireless IC chips are mounted by etching or printing, for example.

Japanese Unexamined Patent Application Publication No. 2000-276569 discloses a wireless IC device formed by rewiring an antenna coil on a wireless IC chip so as to reduce the size thereof. However, since the wireless IC chip itself is very small, the antenna formed on the chip is also very small and has a reduced gain. Accordingly, there is a problem in that the IC chip is not driven unless the IC chip is in very close proximity to a reader-writer.

Japanese Unexamined Patent Application Publication (Translation of PCT Application) No. 2000-311226 discloses a wireless IC device in which a wireless IC chip with an antenna coil is mounted on a substrate having a radiation antenna, that is, a wireless IC device having an arrangement in which the antenna of the substrate is opposed to the antenna coil of the wireless IC chip. However, since the antenna of the substrate is a closed loop, it is difficult to achieve impedance matching between the antenna coil of the wireless IC chip and the antenna of the substrate in frequency bands greater than the Ultra High Frequency (UHF) band, although it is possible to achieve a sufficient gain in lower frequency bands, such as about 13.65 MHz.

SUMMARY OF THE INVENTION

To overcome the problems described above, preferred embodiments of the present invention provide a wireless IC device that has an increased antenna gain, that operates at a sufficient distance from a reader-writer, and that can be used in frequency bands higher than UHF band.

A wireless IC device according to a preferred embodiment of the present invention includes a wireless IC chip having a power supply circuit including a resonant circuit having a predetermined resonant frequency, and a radiation plate that externally radiates a transmission signal supplied from the power supply circuit and that supplies a reception signal externally transmitted to the power supply circuit. The radiation plate is connected to the power supply circuit via an electric field or the radiation plate is coupled to the power supply circuit via a magnetic field and the radiation plate preferably is a two-surface-open type radiation plate including at least one radiation portion arranged to externally exchange a transmission-reception signal and a power supply portion arranged to exchange a transmission-reception signal with the power supply circuit.

In the wireless IC device according to this preferred embodiment of the present invention, the wireless IC chip is provided with the power supply circuit and the radiation plate preferably is a two-surface-open type radiation plate including the radiation portion arranged to externally exchange transmission-reception signals and the power supply portion that is connected to the power supply circuit via the electric field or that is coupled to the power supply circuit via the magnetic field to exchange transmission-reception signals with the power supply circuit. Accordingly, the antenna gain is increased by the radiation portion and, therefore, it is possible to achieve a sufficient gain even with a small power supply circuit. Consequently, the wireless IC chip operates at a sufficient distance from the reader-writer and can be used even in frequency bands higher than the UHF band. In addition, the resonant frequency is primarily determined by the power supply circuit and the shape of the radiation portion can be freely designed. The gain can be adjusted by, for example, varying the size of the radiation portion and the center frequency can be fine-tuned by, for example, varying the shape of the radiation portion.

Preferably, the power supply portion on the radiation plate is arranged such that at least a portion thereof is arranged in the projection plane of the power supply circuit and the area of the power supply portion is preferably smaller than that of the projection plane of the power supply circuit. The projection plane is the plane surrounded by the outline of the power supply circuit and the area of the power supply portion is the area of the metallic portion. When the power supply portion on the radiation plate is coupled to the power supply circuit of the wireless IC chip via the magnetic field, reducing the area of the power supply portion to less than that of the projection plane of the power supply circuit reduces the size of the portion of the power supply circuit preventing the magnetic flux, to thereby improve the transmission efficiency of signals.

The longitudinal length of the power supply portion may be arranged across the projection plane of the power supply circuit. For example, the power supply portion may have a substantially linear shape. The radiation portions may be provided at either side of the power supply portion. Alternatively, the radiation portion may be provided only at one end of the power supply portion. Providing the radiation portions at either side of the power supply portion increases the level of capacitive coupling between the radiation portions and the power supply circuit, and providing the radiation portion only at one end of the power supply portion increases the level of magnetic coupling between the radiation portion and the power supply circuit which increases the gain.

A plurality of power supply circuits may be provided on the wireless IC chip. In this case, at least one of the power supply portions is preferably arranged between the projection planes of the plurality of power supply circuits, for example. The power supply portion may be arranged such that the longitudinal length thereof extends across the projection planes of the plurality of power supply circuits. For example, the power supply portion may have a substantially linear shape. The arrangement of the power supply portion between the plurality of power supply circuits increases the power supply between the power supply portion and the power supply circuits.

The radiation plate may preferably be arranged substantially in the x-y plane and may include radiation portions extending substantially in the x-axis direction and the y-axis direction. With this arrangement, it is possible to receive a substantially circular polarized wave, thus increasing the antenna gain. Alternatively, the radiation plate may include radiation portions extending substantially in the x-axis direction, the y-axis direction, and the z-axis direction in the x-y-z plane. The radiation portions extending three-dimensionally allow efficient transmission-reception to be achieved in any direction.

The area of the projection plane of the power supply portion may be substantially equal to or greater than the area of the projection plane of the power supply circuit. With this arrangement, the efficiency of energy exchanged between the power supply portion and the power supply circuit is improved.

The radiation portion may extend in a direction substantially perpendicular to the plane on which the power supply circuit is arranged. Specifically, the power supply portion may be provided in a plane substantially perpendicular to the radiation portion, which is at the tip of the needle radiation portion, and the power supply portion may be connected to the power supply circuit via the electric field or the power supply portion may be coupled to the power supply circuit via the magnetic field. In this case, the wireless IC device can be attached to an article by inserting the needle radiation portion into the article.

The power supply portion and the power supply circuits may be covered with a magnetic body. With this arrangement, it is possible to prevent leakage of the electromagnetic energy and the level of coupling between the power supply portion and the power supply circuits is increased which increases the antenna gain.

Preferably, the electrical length of the radiation plate is an integral multiple of the half wavelength of the transmission-reception signal, for example. Use of the resonance between the radiation plate and the power supply circuit increases the antenna gain. However, since the frequency is primarily determined by the power supply circuit, the electrical length of the radiation plate may not necessarily be an integral multiple of the half wavelength of the resonant frequency. This is a significant advantage, as compared to a case in which the radiation plate is an antenna element having a predetermined resonant frequency.

The radiation plate may be made of a flexible metal film. The metal film is preferably supported by a flexible film, for example. A radiation plate that can be deformed is easy to operate and the radiation angle can be varied to any direction. In addition, since the resonant frequency is primarily determined by the power supply circuit, as described above, the center frequency is not significantly varied, for example, when the radiation plate is deformed.

The power supply circuit may be a coiled electrode pattern, and the power supply portion may be a coiled electrode pattern having substantially the same shape as that of the power supply circuit. In either case, the efficiency of energy exchanged between the power supply portion and the power supply circuit is improved.

According to preferred embodiments of the present invention, even with the small power supply circuit, it is possible to achieve a higher antenna gain and the wireless IC chip operates at a sufficient distance to a reader-writer and can be used even in frequency bands higher than UHF band. In addition, since the resonant frequency is primarily determined by the power supply circuit of the wireless IC chip, the shape of the radiation portions can be freely designed. The gain can be adjusted by, for example, varying the size of the radiation portions and the center frequency can be fine-tuned by, for example, varying the shape of the radiation portions.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 1A and 1B include diagrams showing a wireless IC device according to a first preferred embodiment of the present invention wherein FIG. 1A is a plan view and FIG. 1B is a side view.

FIGS. 2A and 2B include diagrams showing a first modification of the wireless IC chip wherein FIG. 2A is a perspective view seen from a first principal surface and FIG. 2B is a perspective view seen from a second principal surface.

FIGS. 3A and 3B include diagrams showing a second modification of the wireless IC chip wherein FIG. 3A is a back side view and FIG. 3B is a cross-sectional view.

FIGS. 10A and 10B include diagrams showing a wireless IC device according to a fifth preferred embodiment of the present invention wherein FIG. 10A is a perspective view and FIG. 10B is a cross-sectional view.

FIGS. 18A and 18B include diagrams showing a wireless IC device according to a twelfth preferred embodiment of the present invention wherein FIG. 18A is a developed plan view and FIG. 18B is a perspective view in a use state.

FIGS. 24A and 24B include diagrams showing a wireless IC device according to a seventeenth preferred embodiment of the present invention wherein FIG. 24A is a plan view and FIG. 24B is a side view.

DETAILED DESCRIPTION OF PREFERRED EMBODIMENTS

Figure 3A:
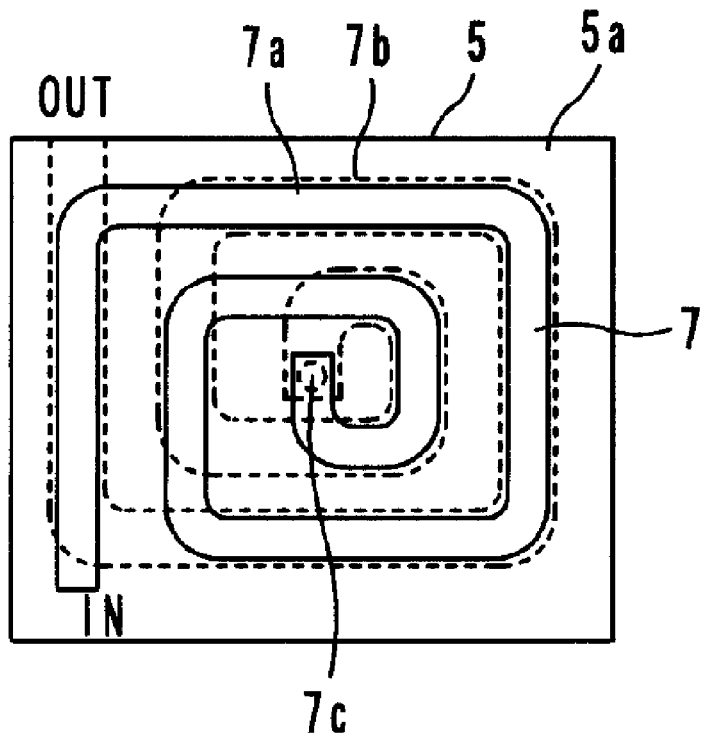

Wireless IC devices according to preferred embodiments of the present invention will be described with reference to the attached drawings. The same reference numerals are used to identify common components and portions in the preferred embodiments described below and a description of such components and portions is omitted.

First Preferred Embodiment

In a wireless IC device 1a according to a first preferred embodiment, as shown in FIGS. 1A and 1B, a radiation plate 11 is provided on a support film 10 and a wireless IC chip 5 is adhered by an adhesive, for example, on a power supply portion 12 on the radiation plate 11 over the support film 10. The radiation plate 11 is a two-surface-open type including the substantially linear power supply portion 12 and radiation portions 13 that are larger than the power supply portion 12. The radiation plate 11 is preferably made of a flexible metal thin film, such as an aluminum foil or a metal evaporated film, for example. The support film 10 is a flexible insulative film preferably made of, for example, polyethylene terephthalate (PET). The support film 10 may also be made of paper or synthetic paper.

The wireless IC chip 5 includes a signal processing portion 6. A power supply circuit 7 defined by a coiled electrode pattern is arranged on a first principal surface 5a opposing the power supply portion 12. The power supply circuit 7 includes a resonant circuit having a predetermined resonant frequency. The power supply circuit 7 is electrically connected to the signal processing portion 6. The power supply circuit 7 is electromagnetically coupled to the power supply portion 12. The wireless IC chip 5 includes known clock circuits, logic circuits, and memory circuits and necessary information is stored in the circuits. The wireless IC chip 5 is capable of transmitting and receiving high-frequency signals having predetermined frequencies.

The radiation plate 11 supplies a transmission signal that is supplied from the power supply circuit 7 and that has a predetermined frequency to the radiation portions 13 through the power supply portion 12 electromagnetically coupled to the power supply circuit 7. The transmission signal is radiated from the radiation portions 13 to an external reader-writer. In addition, the radiation plate 11 supplies a reception signal, such as a high-frequency signal, for example, a UHF-band signal, that is received from the reader-writer with the radiation portions 13 to the power supply circuit 7 through the power supply portion 12. The power supply circuit 7 selects a reception signal having a predetermined frequency from the signals received by the radiation plate 11 and transmits the selected reception signal to the signal processing portion 6 in the wireless IC chip 5.

Specifically, in the wireless IC device 1a, a high-frequency signal, for example, a UHF-band signal, radiated from the reader-writer is received by the radiation portions 13 to resonate the power supply circuit 7 electromagnetically coupled to the power supply portion 12 in order to supply energy to the wireless IC chip 5. On the other hand, this energy is used as a driving source to supply information stored in the wireless IC chip 5 from the power supply circuit 7 to the radiation portions 13 through the power supply portion 12. The information is radiated from the radiation portions 13 to the reader-writer.

In the wireless IC device 1a according to the first preferred embodiment of the present invention, the wireless IC chip 5 is provided with the power supply circuit 7 and the radiation plate 11 is a two-side-open type radiation plate including the radiation portions 13 externally exchanging transmission-reception signals and the power supply portion 12 that is electromagnetically coupled to the power supply circuit 7 to exchange transmission-reception signals with the power supply circuit 7. Accordingly, the antenna gain is increased due to the presence of the radiation portions 13 and, therefore, it is possible to achieve a sufficient gain even with the small power supply circuit 7. Consequently, the wireless IC chip 5 operates at a sufficient distance from the reader-writer and can be used even in frequency bands higher than the UHF band.

The resonant frequency is primarily determined by the power supply circuit 7, and thus, the shape of the radiation portions 13 can be freely designed. The gain can be adjusted by, for example, varying the size of the radiation portions 13 and the center frequency can be fine-tuned by, for example, varying the shape of the radiation portions 13. In addition, the resonant frequency characteristics are not significantly varied even when the wireless IC device 1a is sandwiched between books and the resonant frequency characteristics are not varied even if the wireless IC device 1a is bent or deformed, or the size of the radiation portions 13 is varied. Furthermore, the radiation portions 13 on the radiation plate 11 can be extended in all directions with respect to the power supply circuit 7, thus increasing the antenna gain.

The linear power supply portion 12 on the radiation plate 11 is arranged in the projection plane (the portion surrounded by the outline of the power supply circuit 7) of the power supply circuit 7 of the wireless IC chip 5 so as to extend across the projection plane. The area of the power supply portion 12 is less than that of the projection plane of the power supply circuit 7. The area of the power supply portion 12 means the area of the metallic portion. Since making the area of the power supply portion 12 less than that of the projection plane of the power supply circuit 7 reduces the size the portion of the power supply circuit 7 preventing the magnetic flux, the transmission efficiency of signals is improved. In addition, it is not necessary to attach the wireless IC chip 5 on the radiation plate 11 with extreme accuracy. Since the radiation portions 13 are provided on either side of the power supply portion 12, the amount of capacitive coupling between the power supply portion 12 and the power supply circuit 7 is increased.

Furthermore, since the radiation plate 11 is made of a flexible metal film disposed on the flexible support film 10, the radiation plate 11 can be attached to a flexible object, such as a bag made of a plastic film, without any problems.

Since the wireless IC chip 5 is adhered to the radiation plate 11 by an adhesive, for example, there is no need for heating adhesion using soldering or a conductive adhesive and the radiation plate 11 and the support member (the support film 10) can be made of materials that have a relatively low heat resistance.

Although the helical-coiled power supply circuit 7 is shown, the spiral-coiled power supply circuit 7 may be used or the power supply circuit 7 may be composed of a meander linear electrode pattern, for example.

First Modification of Wireless IC Chip

FIGS. 2A and 2B include diagrams showing a modification of the first preferred embodiment of the present invention in which the meandering power supply circuit 7 is provided on the first principal surface 5a (the surface adhered to the radiation plate 11) of the wireless IC chip 5 to perform impedance conversion or design of the center frequency and an integrated circuit 8 functioning as a signal processing circuit is provided on a second principal surface 5b at the opposite side of the first principal surface 5a. Providing the power supply circuit 7 on the first principal surface 5a and the integrated circuit 8 on the second principal surface 5b allows the size of the wireless IC chip 5 to be reduced and increases the strength thereof.

Second Modification of Wireless IC Chip

Figure 3B:
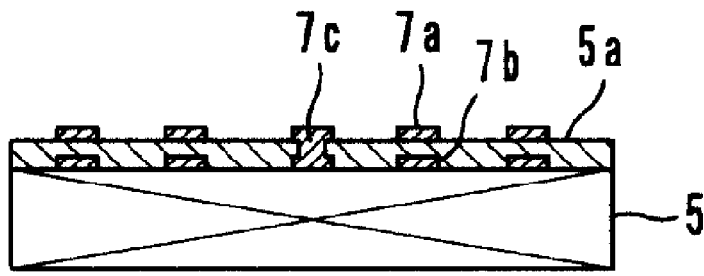
Figure 4:
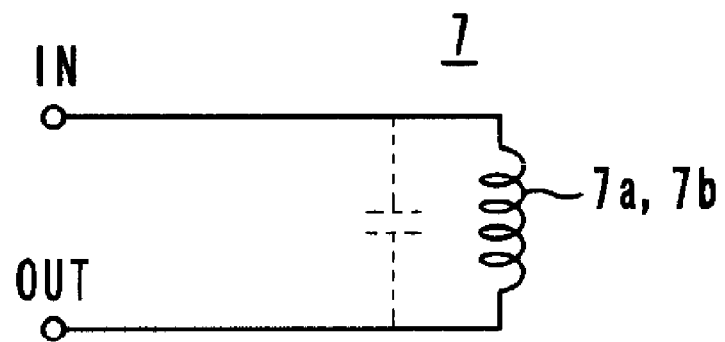
FIG. 4 is an equivalent circuit of a power supply circuit according to the second modification of the wireless IC chip.

FIGS. 3A and 3B include diagrams showing another modification of the first preferred embodiment of the present invention in which the multilayer power supply circuit 7 including spiral conductive patterns 7a and 7b is provided on the first principal surface 5a (the surface adhered to the radiation plate 11) of the wireless IC chip 5. One end of the conductive pattern 7a is an IN terminal and one end of the conductive pattern 7b is an OUT terminal. The conductive pattern 7a overlaps the conductive pattern 7b, and the other end of the conductive pattern 7a is connected to the other end of the conductive pattern 7b by a via-hole conductor 7c. This power supply circuit 7 defines an equivalent circuit shown in FIG. 4. Since the power supply circuit 7 is wound twice, the size of the coil itself is reduced and the stray capacitances thereof are substantially in parallel. Accordingly, it is possible to decrease the resonant frequency.

Second Preferred Embodiment

Figure 5:
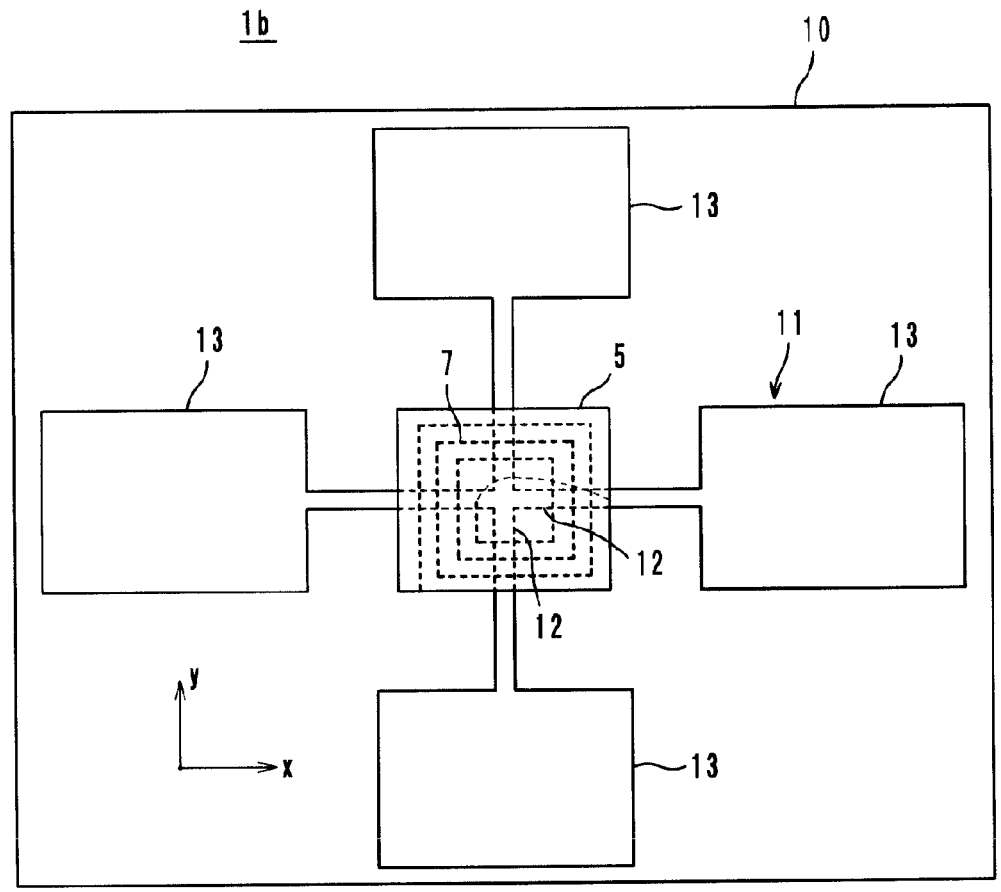
FIG. 5 is a plan view showing a wireless IC device according to a second preferred embodiment of the present invention.

In a wireless IC device 1b according to a second preferred embodiment of the present invention, as shown in FIG. 5, the radiation plate 11 preferably made of a metal thin film, such as an aluminum foil or a metal evaporated film, for example, is arranged on the support film 10. The radiation plate 11 includes the cruciform power supply portion 12 and relatively large radiation portions 13 that are connected to all of the ends of the power supply portion 12 and that extend in the x direction and the y direction. The wireless IC chip 5 is adhered by an adhesive, for example, on the support film 10 such that the center of the power supply circuit 7 substantially coincides with the cross-point of the power supply portion 12. Although the center of the power supply circuit 7 preferably substantially coincides with the cross-point of the power supply portion 12, the center of the power supply circuit 7 may be slightly shifted from the cross-point of the power supply portion 12.

The operational effects of the wireless IC device 1b are similar to those in the first preferred embodiment described above. Specifically, a high-frequency signal (for example, a UHF-band signal) radiated from a reader-writer is received by the radiation portions 13 to resonate the power supply circuit 7 electromagnetically coupled to the power supply portion 12 in order to supply energy to the wireless IC chip 5. On the other hand, this energy is used as a driving source to supply information stored in the wireless IC chip 5 from the power supply circuit 7 to the radiation portions 13 through the power supply portion 12. The information is radiated from the radiation portions 13 to the reader-writer.

Third Preferred Embodiment

Figure 6:
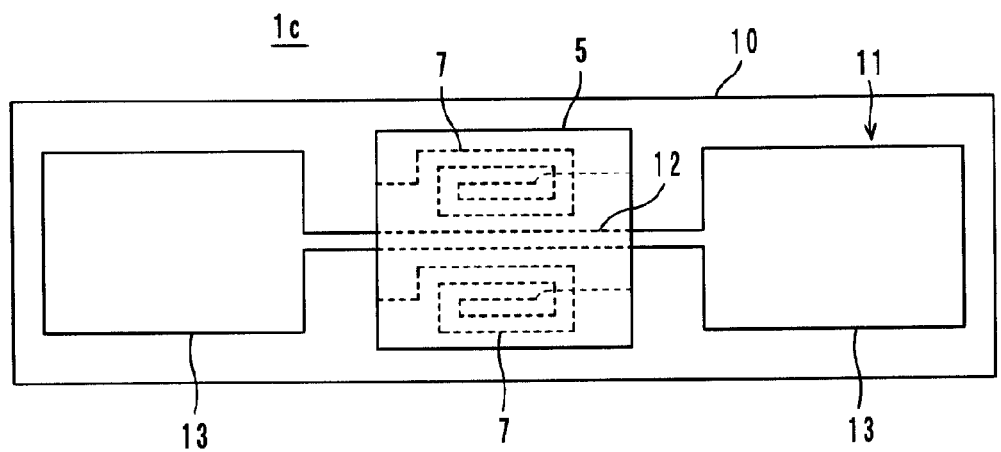
FIG. 6 is a plan view showing a wireless IC device according to a third preferred embodiment of the present invention.

In a wireless IC device 1c according to a third preferred embodiment of the present invention, as shown in FIG. 6, the power supply circuits 7 including two coiled electrode patterns are provided on the rear surface of the wireless IC chip 5 and the linear power supply portion 12 on the radiation plate 11 is arranged between the power supply circuits 7.

Figure 7:
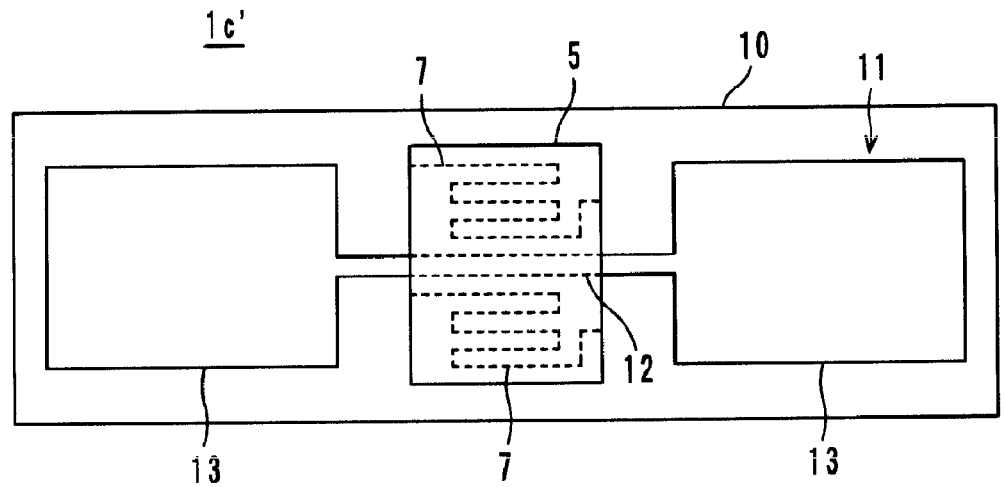
FIG. 7 is a plan view showing a modification of the third preferred embodiment of the present invention.

FIG. 7 shows a wireless IC device 1c' according to a modification of the third preferred embodiment. In the wireless IC device 1c', the power supply circuits 7 of the wireless IC chip 5 are defined by two meandering electrode patterns. The remaining arrangement is similar to that of the wireless IC device 1c. The horizontal meandering patterns may used or the vertical meander patterns may be used, for example.

The operational effects of the wireless IC device 1c and the wireless IC device 1c' are similar to those in the first preferred embodiment described above. Specifically, a high-frequency signal (for example, a UHF-band signal) radiated from a reader-writer is received by the radiation portions 13 to resonate the power supply circuits 7 electromagnetically coupled to the power supply portion 12 in order to supply energy to the wireless IC chip 5. On the other hand, this energy is used as a driving source to supply information stored in the wireless IC chip 5 from the power supply circuits 7 to the radiation portions 13 through the power supply portion 12. The information is radiated from the radiation portions 13 to the reader-writer.

Particularly, since the power supply portion 12 on the radiation plate 11 is not arranged across from the power supply circuit 7 in the wireless IC device 1c and the wireless IC device 1c', the variation of the electromagnetic field is extremely small and the center frequency is not significantly varied. Accordingly, even if the mounting position of the wireless IC chip 5 is slightly shifted, it is unlikely to cause a significant variation in the center frequency.

Figure 8:
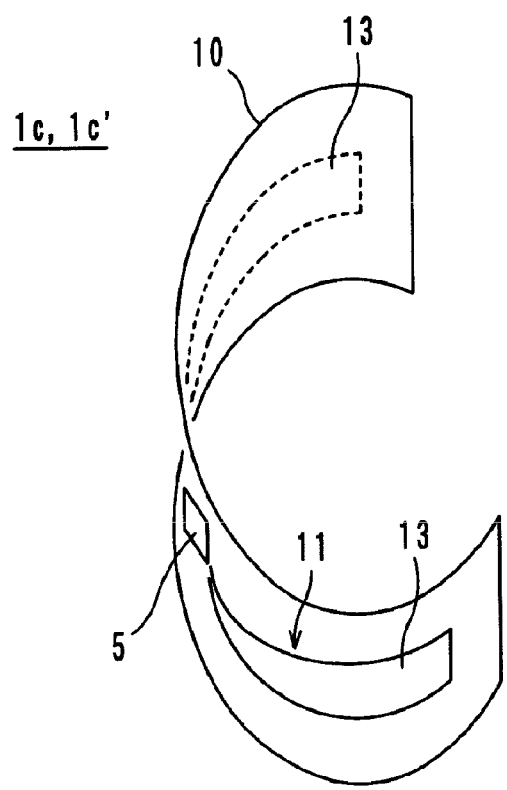
FIG. 8 is a perspective view showing a use state according to the third preferred embodiment of the present invention.

In addition, since the support film 10 and the radiation plate 11 are flexible, each of the wireless IC device 1c and the wireless IC device 1c' can be used in a state in which the support film 10 is curved as shown in FIG. 8 and is adhered to a bottle-shaped article, for example. In such a case, it is possible to utilize the advantage that the resonant frequency is primarily determined by the power supply circuits 7 and the center frequency is not varied with varying shapes of the radiation portions 13. The support film 10 can be curved and adhered to an article in the other preferred embodiments as well.

Fourth Preferred Embodiment

Figure 9:
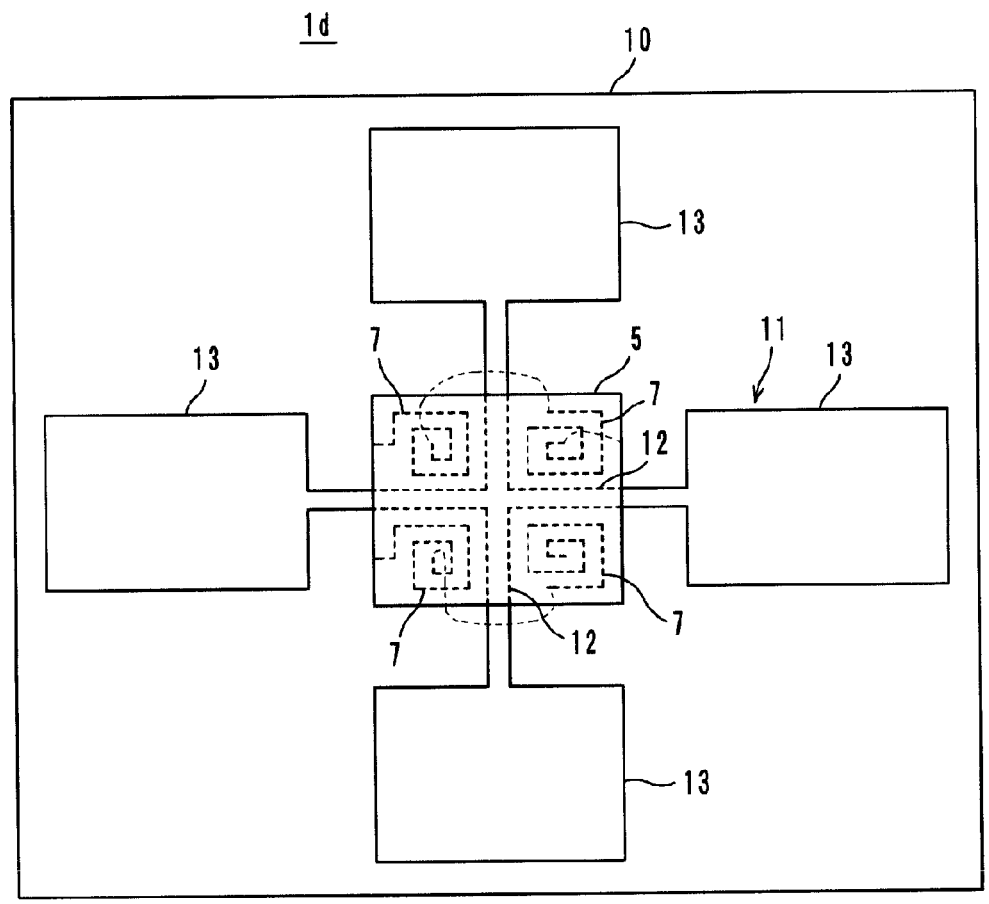
FIG. 9 is a plan view showing a wireless IC device according to a fourth preferred embodiment of the present invention.

In a wireless IC device 1d according to a fourth preferred embodiment of the present invention, as shown in FIG. 9, the power supply circuits 7 including four coiled electrode patterns are provided on the rear surface of the wireless IC chip 5 and the radiation plate 11 preferably made of a metal thin film, such as an aluminum foil or a metal evaporated film, for example, is provided on the support film 10. The radiation plate 11 includes a cruciform power supply portion 12 and relatively large radiation portions 13 that are connected to all of the ends of the power supply portion 12. The wireless IC chip 5 is adhered on the support film 10 such that the central portion of the four power supply circuits 7 substantially coincides with the cross-point of the power supply portion 12.

The operational effects of the wireless IC device 1d are similar to those in the first preferred embodiment described above. Specifically, a high-frequency signal (for example, a UHF-band signal) radiated from a reader-writer is received by the radiation portions 13 to resonate the power supply circuits 7 electromagnetically coupled to the power supply portion 12 in order to supply energy to the wireless IC chip 5. On the other hand, this energy is used as a driving source to supply information stored in the wireless IC chip 5 from the power supply circuits 7 to the radiation portions 13 through the power supply portion 12. The information is radiated from the radiation portions 13 to the reader-writer.

Particularly, since the power supply portion 12 on the radiation plate 11 is not arranged across from the power supply circuit 7 in the wireless IC device 1d, as in the third preferred embodiment, the variation of the electromagnetic field is extremely small and the center frequency is not significantly varied. Accordingly, even if the mounting position of the wireless IC chip 5 is slightly shifted, it is unlikely to cause a significant variation in the center frequency.

Fifth Preferred Embodiment

Figure 10A:
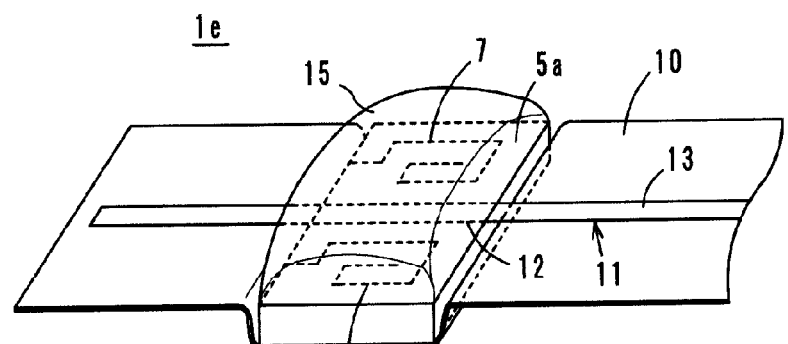
Figure 10B:
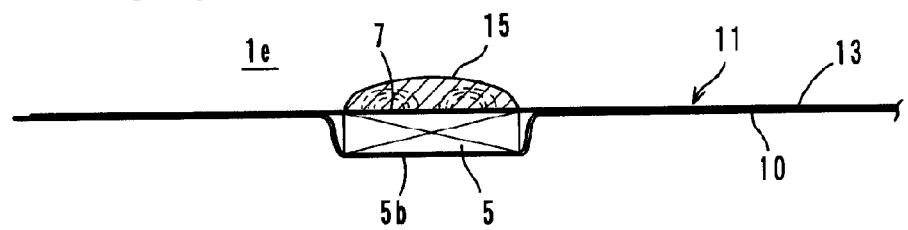

In a wireless IC device 1e according to a fifth preferred embodiment of the present invention, as shown in FIGS. 10A and 10B, the power supply circuits 7 including two coiled electrode patterns are provided on the first principal surface 5a of the wireless IC chip 5 and the linear power supply portion 12 on the radiation plate 11 is arranged between the power supply circuits 7. The power supply circuits 7 and the power supply portion 12 are preferably covered with a magnetic body 15.

The radiation plate 11 is defined by a single line on the support film 10 made of a long sheet. One end of the radiation plate 11 functions as the power supply portion 12 and the radiation portion 13 extends from the power supply portion 12. The power supply portion 12 is arranged between the two power supply circuits 7. The portion of the support film 1 corresponding to the power supply portion 12 is wrapped around the second principal surface 5b of the wireless IC chip 5.

The operational effects of the wireless IC device 1e are similar to those in the first preferred embodiment described above. Specifically, a high-frequency signal (for example, a UHF-band signal) radiated from a reader-writer is received by the radiation portion 13 to resonate the power supply circuits 7 electromagnetically coupled to the power supply portion 12 in order to supply energy to the wireless IC chip 5. On the other hand, this energy is used as a driving source to supply information stored in the wireless IC chip 5 from the power supply circuits 7 to the radiation portion 13 through the power supply portion 12. The information is radiated from the radiation portion 13 to the reader-writer.

Particularly, in the wireless IC device 1e, the power supply circuits 7 and the power supply portion 12 are preferably covered with the magnetic body 15, which is produced by dispersing magnetic powder, such as ferrite, for example, in resin. Accordingly, the electromagnetic energy does not leak out of the magnetic body 15 and the level of coupling between the power supply circuits 7 and the power supply portion 12 is increased so as to increase the antenna gain. In addition, as in the third preferred embodiment described above, since the power supply portion 12 on the radiation plate 11 is not arranged across from the power supply circuits 7, the variation of the electromagnetic field is extremely small and the center frequency is not significantly varied. Accordingly, even if the mounting position of the wireless IC chip 5 is slightly shifted, it is unlikely to cause a significant variation in the center frequency. The wireless IC chip 5 may be provided in a central portion of the radiation plate 11, instead of at one end of the radiation plate 11.

Figure 11:
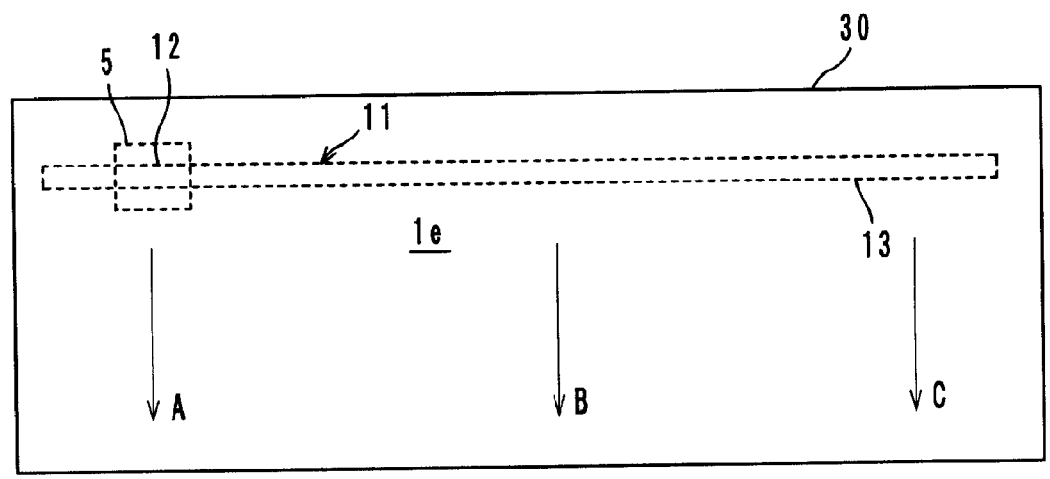
FIG. 11 is a plan view showing a use state according to the fifth preferred embodiment of the present invention.

FIG. 11 shows a preferred embodiment of the present invention in which the wireless IC device 1e is embedded in a certificate 30. It is assumed that the certificate 30 is made of two sheets adhered to each other, for example. Forming the radiation plate 11 on one of the sheets eliminates the need to provide the support film 10. Since, for example, a microchip in the related art has a lower antenna gain, it is not possible to practically establish communication with a reader-writer unless the microchip is disposed in contact with the reader-writer. That is, it is necessary to scan a portion indicated by an arrow A in FIG. 11 with the reader-writer and it is difficult to practically use the microchip in the related art. In contrast, the wireless IC device 1e can be used to increase the antenna gain and portions indicated by arrows B and C can be scanned with the reader-writer to establish communication with the reader-writer. In addition, since the radiation plate 11 may have a small thickness of several micrometers, for example, the wireless IC device 1e can be used for a bill, in addition to the certificate. Not only the wireless IC device 1e but also the wireless IC devices 1a to 1d and various wireless IC devices described below can be used in this manner.

Sixth Preferred Embodiment

Figure 12:
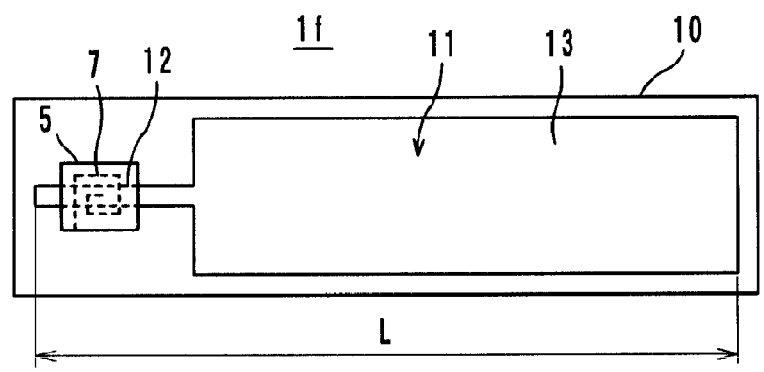
FIG. 12 is a plan view showing a wireless IC device according to a sixth preferred embodiment of the present invention.

In a wireless IC device 1f according to a sixth preferred embodiment, as shown in FIG. 12, the radiation plate 11 preferably made of a metal thin film, such as an aluminum foil or a metal evaporated film, for example, is provided on the support film 10 and the wireless IC chip 5 is adhered on the support film 10, such that the power supply circuit 7 of the wireless IC chip 5 overlaps the power supply portion 12. The radiation plate 11 includes the substantially linear power supply portion 12 and the relatively large radiation portion 13.

The wireless IC chip 5 is arranged at one end of the radiation plate 11 and the electrical length L of the radiation plate 11 is preferably not greater than about $\lambda/2$, for example, where "$\lambda$" denotes the center frequency. When the electrical length L of the radiation plate 11 is equal to about $\lambda/2$, the energy of the radiation plate 11 is maximized at the ends thereof. Accordingly, coupling the radiation plate 11 to the power supply circuit 7 of the wireless IC chip 5 at the position where the maximum energy is produced allows the level of magnetic coupling to be increased, thus improving the antenna gain.

The other operational effects of the wireless IC device 1f are similar to those in the first preferred embodiment described above. Specifically, a high-frequency signal (for example, a UHF-band signal) radiated from a reader-writer is received by the radiation portion 13 to resonate the power supply circuits 7 electromagnetically coupled to the power supply portion 12 in order to supply energy to the wireless IC chip 5. On the other hand, this energy is used as a driving source to supply information stored in the wireless IC chip 5 from the power supply circuits 7 to the radiation portion 13 through the power supply portion 12. The information is radiated from the radiation portion 13 to the reader-writer.

Seventh Preferred Embodiment

Figure 13:
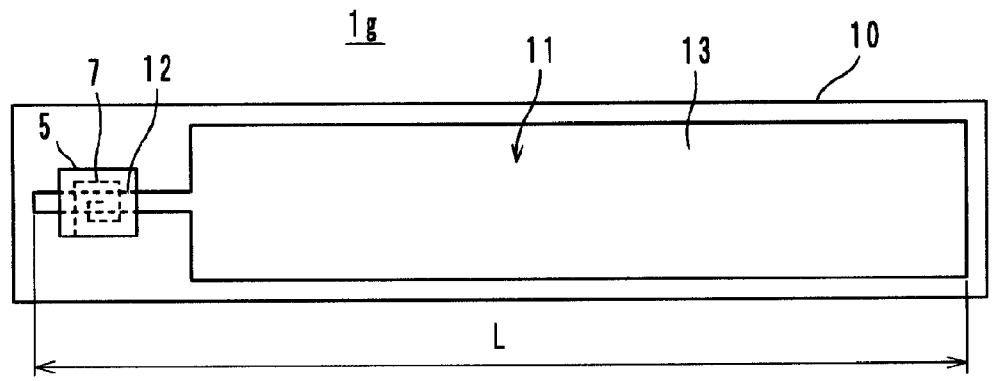
FIG. 13 is a plan view showing a wireless IC device according to a seventh preferred embodiment of the present invention.

A wireless IC device 1g according to a seventh preferred embodiment of the present invention has a basic arrangement that is similar to that of the wireless IC device 1f according to the sixth preferred embodiment, as shown in FIG. 13. In the wireless IC device 1g, the electrical length L of the radiation plate 11 is set to a value that is preferably approximately an integral multiple of $\lambda/2$, for example, where "$\lambda$" denotes the center frequency. When the electrical length L of the radiation plate 11 is an integral multiple of $\lambda/2$, a resonance occurs between the radiation plate 11 and the power supply circuit 7 so as to increase the antenna gain. The other operational effects are similar to those in the sixth preferred embodiment.

However, the electrical length L of the radiation plate 11 may not be an integral multiple of $\lambda/2$. In other words, since the frequency of a signal radiated from the radiation plate 11 is primarily determined by the resonant frequency of the power supply circuit 7, the frequency characteristics do not significantly depend on the electrical length of the radiation plate 11. It is preferable that the electrical length of the radiation plate 11 be approximately an integral multiple of $\lambda/2$, for example, because the maximum gain is achieved.

Eighth Preferred Embodiment

Figure 14:
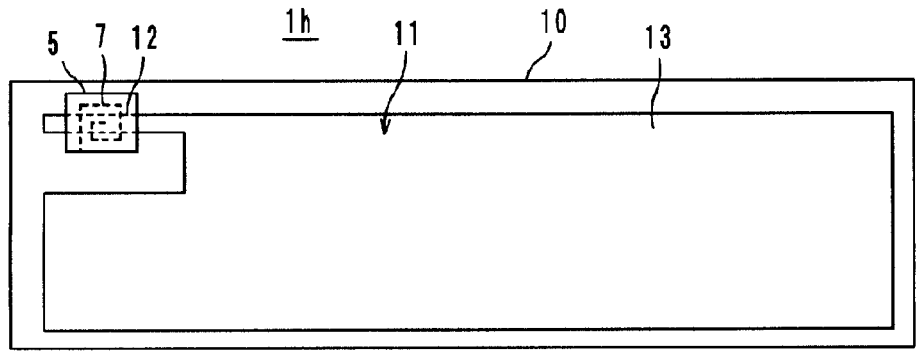
FIG. 14 is a plan view showing a wireless IC device according to an eighth preferred embodiment of the present invention.

In a wireless IC device 1h according to an eighth preferred embodiment of the present invention, as shown in FIG. 14, a larger radiation plate 11 preferably made of a metal thin film, such as an aluminum foil or a metal evaporated film, for example is provided on the larger support film 10. A portion of the radiation plate 11 is used as the linear power supply portion 12 and the remaining portion of the radiation plate 11 is used as the radiation portion 13. The wireless IC chip 5 is adhered by an adhesive, for example, on the support film 10 such that the power supply circuit 7 of the wireless IC chip 5 overlaps the power supply portion 12.

The operational effects of the wireless IC device 1h are similar to those in the first preferred embodiment and the sixth preferred embodiment described above. Particularly, since the radiation portion 13 has a larger area, the antenna gain is increased.

Ninth Preferred Embodiment

Figure 15:
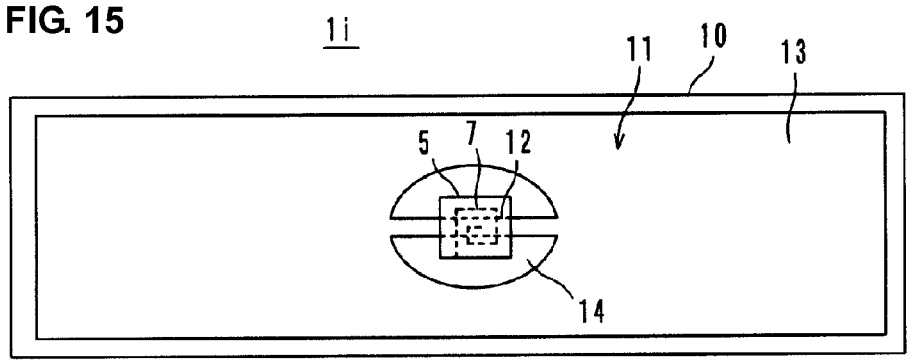
FIG. 15 is a plan view showing a wireless IC device according to a ninth preferred embodiment of the present invention.

In a wireless IC device 1i according to a ninth preferred embodiment of the present invention, as shown in FIG. 15, a larger radiation plate 11 preferably made of a metal thin film, such as an aluminum foil or a metal evaporated film, for example, is provided on the larger support film 10, as in the eight preferred embodiment. The substantially linear power supply portion 12 is provided on the radiation plate 11 with openings 14 provided at central portions of the radiation plate 11. The remaining portion of the radiation plate 11 is used as the radiation portion 13. The wireless IC chip 5 is adhered by an adhesive, for example, on the support film 10 such that the power supply circuit 7 of the wireless IC chip 5 overlaps the power supply portion 12. The operational effects of the wireless IC device 1i are similar to those in the eighth preferred embodiment described.

Tenth Preferred Embodiment

Figure 16:
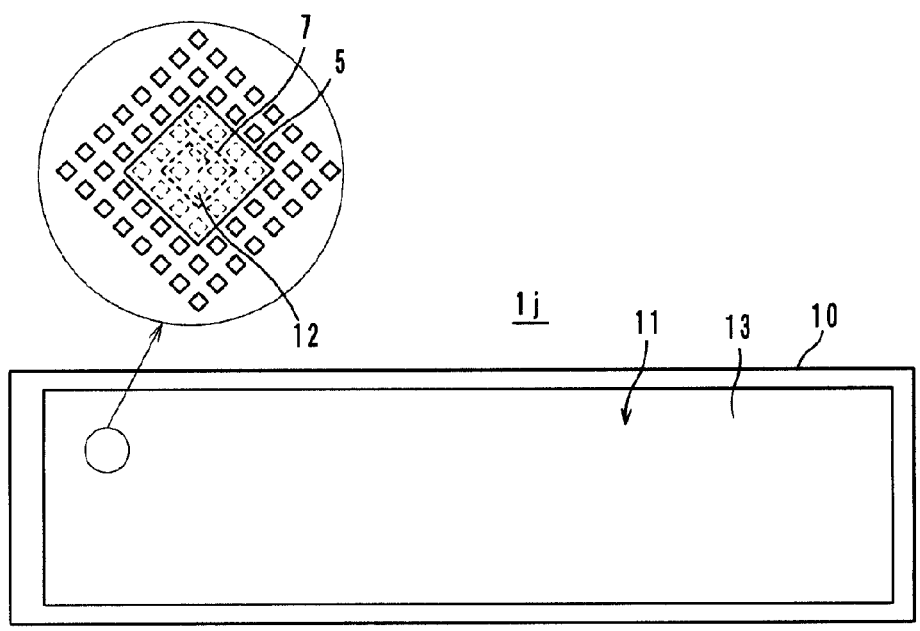
FIG. 16 is a plan view showing a wireless IC device according to a tenth preferred embodiment of the present invention.

In a wireless IC device 1j according to a tenth preferred embodiment of the present invention, as shown in FIG. 16, the larger radiation plate 11 preferably made of a metal thin film, such as an aluminum foil or a metal evaporated film, for example, is provided on the larger support film 10. The meshed power supply portion 12 is provided on a portion of the radiation plate 11. The power supply portion 12 includes multiple openings that are regularly or irregularly arranged. The wireless IC chip 5 is adhered by an adhesive, for example, on the support film 10 such that the power supply circuit 7 of the wireless IC chip 5 overlaps the power supply portion 12. The power supply circuit 7 is coupled to the power supply portion 12 via the magnetic field. The operational effects of the wireless IC device 1j are similar to those in the eighth and ninth preferred embodiments described above.

Eleventh Preferred Embodiment

Figure 17:
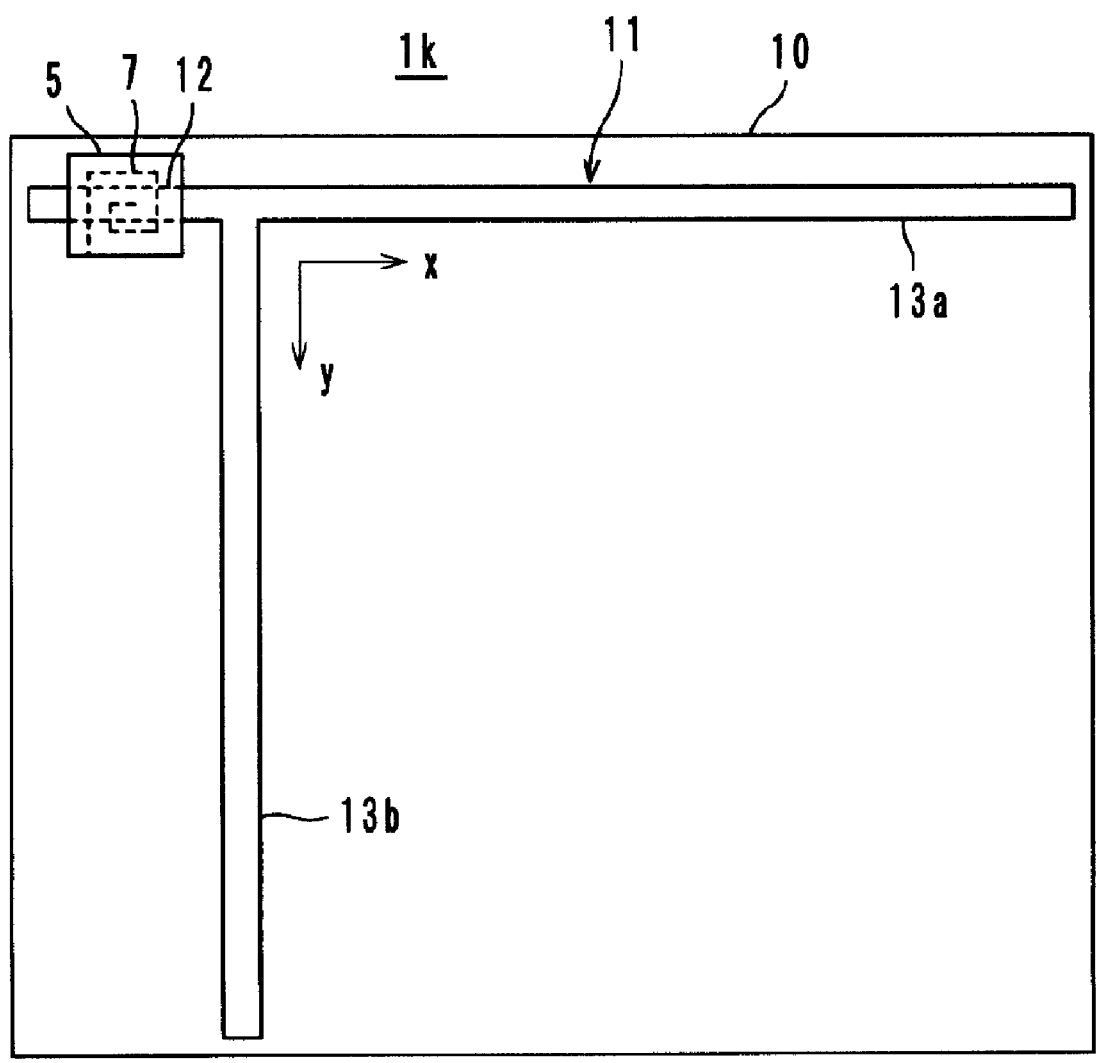
FIG. 17 is a plan view showing a wireless IC device according to an eleventh preferred embodiment of the present invention.

In a wireless IC device 1k according to an eleventh preferred embodiment of the present invention, as shown in FIG. 17, the radiation plate 11 is preferably branched at an angle of about 90°, for example. Specifically, the radiation plate 11 includes a radiation portion 13a extending substantially in the x-axis direction in the x-y plane and a radiation portion 13b extending substantially in the y-axis direction. The linear power supply portion 12 is provided on an extension of the radiation portion 13a. The wireless IC chip 5 is adhered by an adhesive, for example, on the support film 10 such that the power supply circuit 7 of the wireless IC chip 5 overlaps the power supply portion 12.

The operational effects of the wireless IC device 1k are similar to those in the first preferred embodiment described above. Specifically, a high-frequency signal (for example, a UHF-band signal) radiated from a reader-writer is received by the radiation portions 13a and 13b to resonate the power supply circuit 7 electromagnetically coupled to the power supply portion 12 in order to supply energy to the wireless IC chip 5. On the other hand, this energy is used as a driving source to supply information stored in the wireless IC chip 5 from the power supply circuit 7 to the radiation portions 13a and 13b through the power supply portion 12. The information is radiated from the radiation portions 13a and 13b to the reader-writer. In addition, since the radiation portions 13a and 13b extend substantially in the x-axis direction and the y-axis direction, respectively, in the wireless IC device 1k, it is possible to receive a substantially circular polarized wave, thus increasing the antenna gain.

Twelfth Preferred Embodiment

Figure 18A:
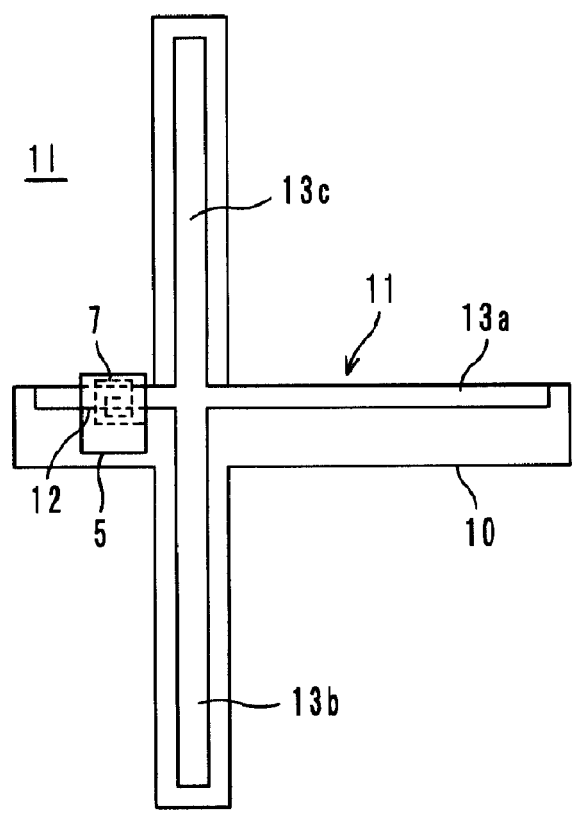
Figure 18B:
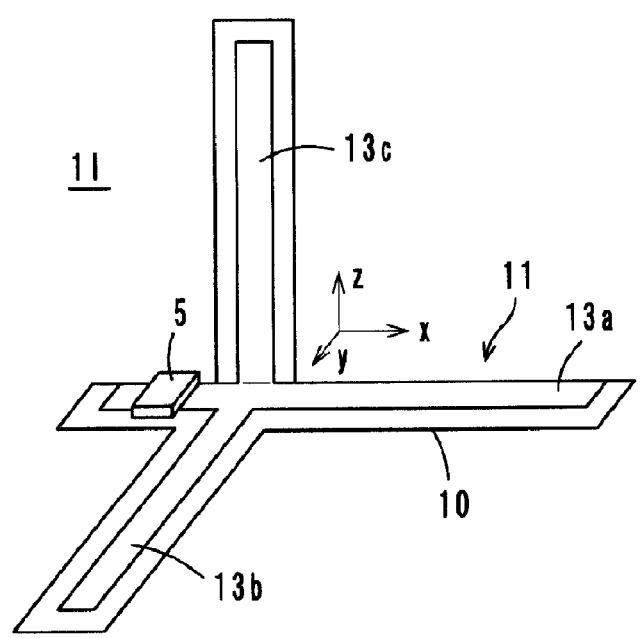

In a wireless IC device 1l according to a twelfth preferred embodiment of the present invention, as shown in FIGS. 18A and 18B, the radiation plate 11 includes radiation portions 13a, 13b, and 13c extending substantially in the x-axis direction, the y-axis direction, and the z-axis direction, respectively, in the x-y-z plane. The linear power supply portion 12 is provided at approximately the center of the radiation portions 13a, 13b, and 13c. The wireless IC chip 5 is adhered by an adhesive, for example, on the support film 10 such that the power supply circuit 7 of the wireless IC chip 5 overlaps the power supply portion 12.

The wireless IC device 1l can be used, for example, in a manner such that the wireless IC device 1l is adhered to the corners of a box-shaped object. Since the radiation portions 13a, 13b, and 13c extend three-dimensionally, the directivity of the antenna is eliminated and, therefore, it is possible to achieve efficient transmission-reception in any direction. In addition, the other operational effects of the wireless IC device 1l are similar to those in the first preferred embodiment described above.

Thirteenth Preferred Embodiment

Figure 19:
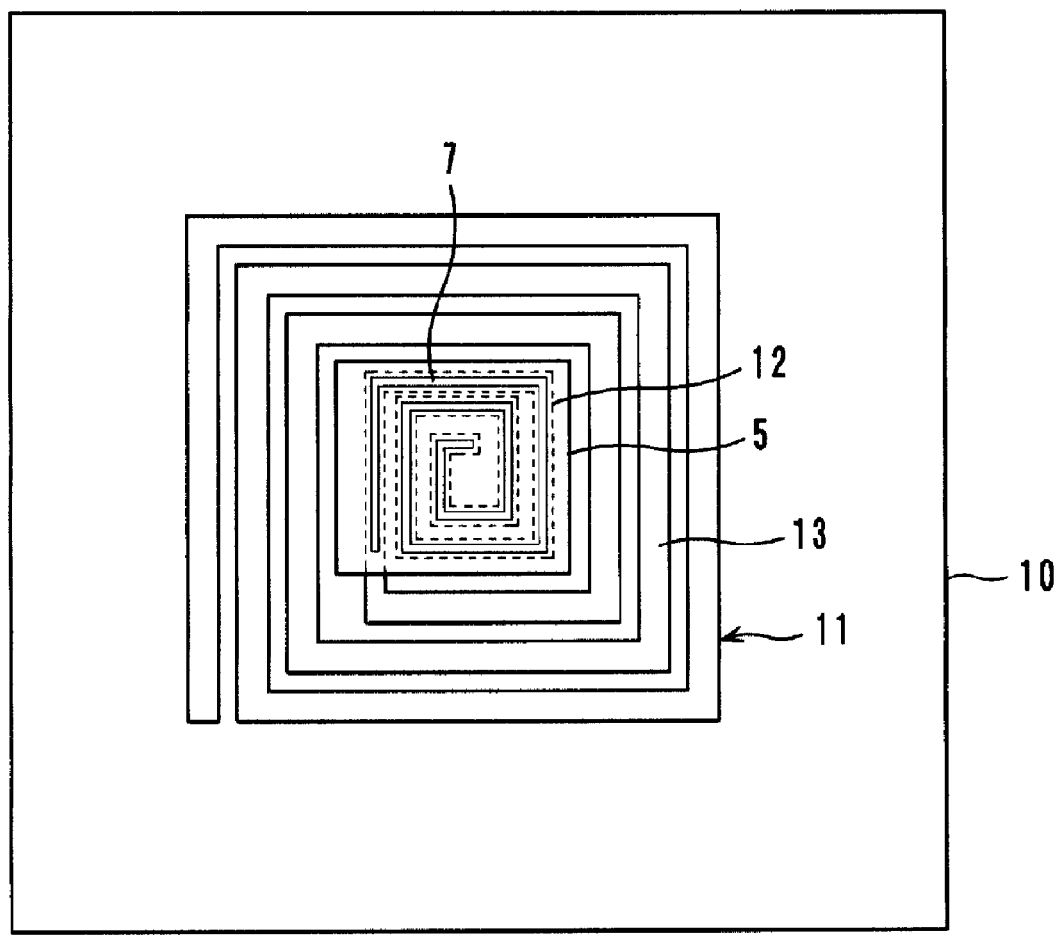
FIG. 19 is a plan view showing a wireless IC device according to a thirteenth preferred embodiment of the present invention.
Figure 20:
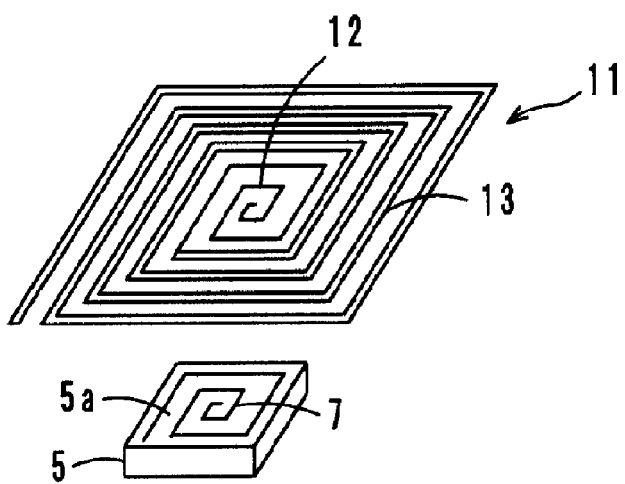
FIG. 20 is a perspective view showing the main portions of the thirteenth preferred embodiment of the present invention.

In a wireless IC device 1m according to a thirteenth preferred embodiment of the present invention, as shown in FIGS. 19 and 20, the power supply circuit 7 includes a coiled electrode pattern provided on the first principal surface 5a of the wireless IC chip 5. The radiation plate 11 of a two-end-open type is provided on the support film 10. The radiation plate 11 includes the power supply portion 12 having substantially the same shape as that of the power supply circuit 7 and the coiled radiation portion 13 extending from one end of the power supply portion 12. The radiation portion 13 includes a line slightly wider than the power supply portion 12, and the coiled power supply portion 12 is electromagnetically coupled to the power supply circuit 7.

The power supply circuit 7 is indicated by a thin line in FIG. 19. In addition, the line width of the power supply circuit 7 is preferably substantially the same as that of the power supply portion 12.

The operational effects of the wireless IC device 1m are similar to those in the first preferred embodiment described above. Specifically, a high-frequency signal (for example, a UHF-band signal) radiated from a reader-writer is received by the radiation portion 13 to resonate the power supply circuit 7 electromagnetically coupled to the power supply portion 12 in order to supply energy to the wireless IC chip 5. On the other hand, this energy is used as a driving source to supply information stored in the wireless IC chip 5 from the power supply circuit 7 to the radiation portion 13 through the power supply portion 12. The information is radiated from the radiation portion 13 to the reader-writer. Furthermore, the area of the projection plane of the power supply portion 12 is substantially the same as that of the projection plane of the power supply circuit 7 in the wireless IC device 1m and, therefore, the efficiency of energy exchanged between the power supply portion 12 and the power supply circuit 7 is improved. The area of the projection plane of the power supply portion 12 may be greater than that of the projection plane of the power supply circuit 7 because the increased gain is achieved thereby.

Fourteenth Preferred Embodiment

Figure 21:
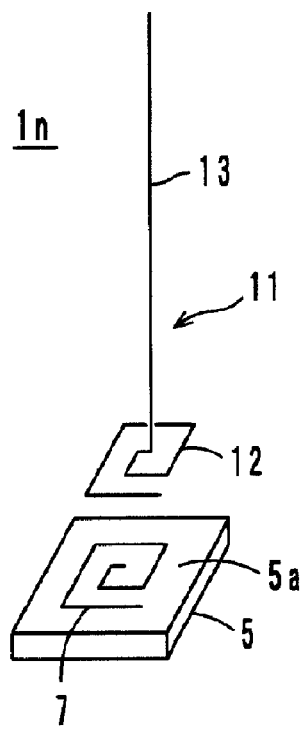
FIG. 21 is a perspective view showing a wireless IC device according to a fourteenth preferred embodiment of the present invention.

In a wireless IC device 1n according to a fourteenth preferred embodiment of the present invention, as shown in FIG. 21, one tip of the needle radiation portion 13 is bent to form the helical power supply portion 12 in a plane substantially perpendicular to the radiation portion 13. The power supply portion 12 is fixed on the first principal surface 5a of the wireless IC chip 5 by an adhesive, for example, to electromagnetically couple the power supply portion 12 to the power supply circuit 7 provided on the first principal surface 5a. The power supply portion 12 has substantially the same shape as that of the power supply circuit 7, as in the thirteenth preferred embodiment described above.

In the wireless IC device 1n, the radiation portion 13 extends in a direction substantially perpendicular to the plane on which the power supply circuit 7 is arranged. Accordingly, the wireless IC device 1n can preferably be attached to an article by inserting the needle radiation portion 13 into the article, as in a pin stop, for example. The operational effects of the wireless IC device 1n are similar to those in the thirteenth preferred embodiment described above.

Fifteenth Preferred Embodiment

Figure 22:
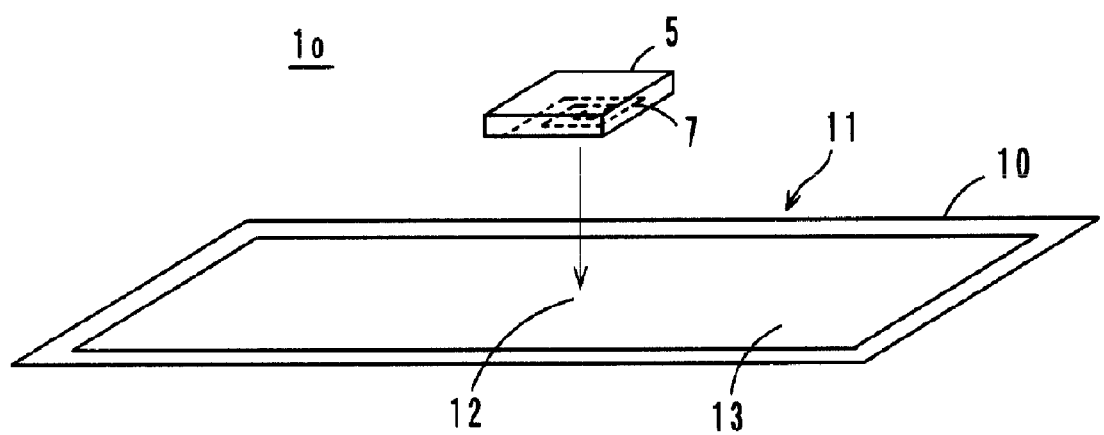
FIG. 22 is an exploded perspective view showing a wireless IC device according to a fifteenth preferred embodiment of the present invention.

In a wireless IC device 1o according to a fifteenth preferred embodiment of the present invention, as shown in FIG. 22, the radiation plate 11 preferably made of a metal thin film, such as an aluminum foil or a metal evaporated film, for example, is arranged over the larger support film 10. The wireless IC chip 5 is adhered on the support film 10. The power supply circuit 7 is arranged on the rear surface of the wireless IC chip 5. The portion of the radiation plate 11 opposing the power supply circuit 7 functions as the power supply portion 12 and the remaining portion thereof functions as the radiation portion 13.

In the wireless IC device 1o, the power supply circuit 7 of the wireless IC chip 5 is electromagnetically coupled to the planar power supply portion 12 to enable exchange of transmission-reception signals between the power supply circuit 7 and the power supply portion 12. The operational effects of the wireless IC device 1o are similar to those in the first preferred embodiment described above.

Sixteenth Preferred Embodiment

Figure 23:
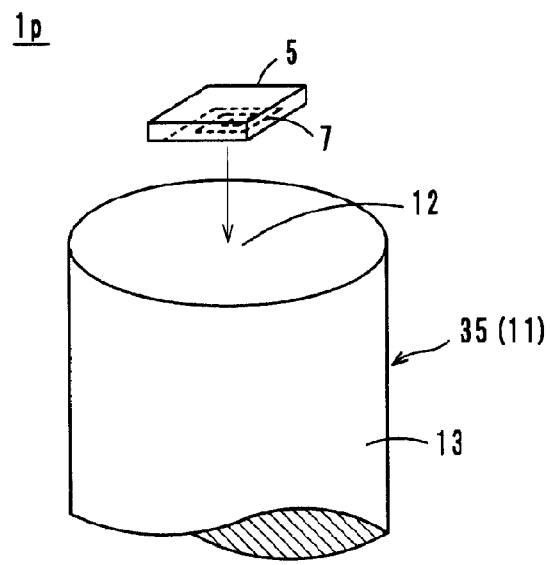
FIG. 23 is an exploded perspective view showing a wireless IC device according to a sixteenth preferred embodiment of the present invention.

In a wireless IC device 1p according to a sixteenth preferred embodiment of the present invention, as shown in FIG. 23, a metal pole body 35 defines the radiation plate. The wireless IC chip 5 is adhered on an end surface of the metal pole body 35. The portion opposing the power supply circuit 7 functions as the power supply portion 12 and the entire surface of the metal pole body 35 functions as the radiation portion 13.

In the wireless IC device 1p, the power supply circuit 7 of the wireless IC chip 5 is electromagnetically coupled to the planar power supply portion 12 to enable exchange of transmission-reception signals between the power supply circuit 7 and the power supply portion 12. The operational effects of the wireless IC device 1o are similar to those in the first preferred embodiment described above.

Seventeenth Preferred Embodiment

Figure 24A:
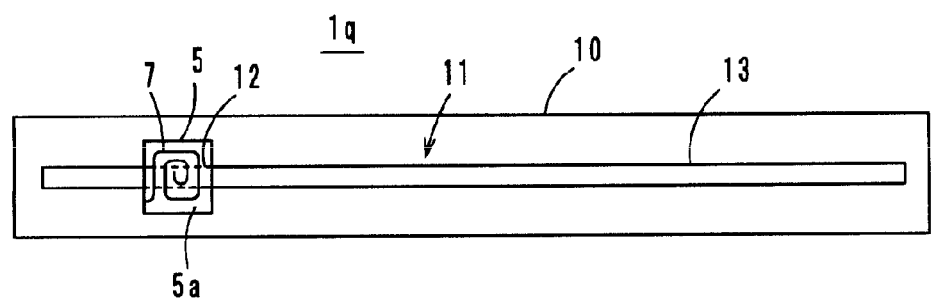
Figure 24B:
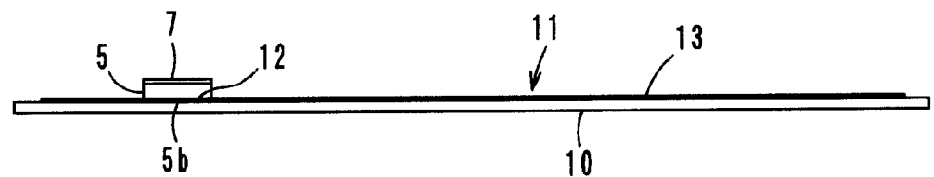

In a wireless IC device 1q according to a seventeenth preferred embodiment of the present invention, as shown in FIGS. 24A and 24B, the radiation plate 11 preferably made of a flexible metal thin film, such as an aluminum foil or a metal evaporated film, for example, is provided on the larger support film 10. The wireless IC chip 5 is adhered on the support film 10. The power supply circuit 7 including a coiled electrode pattern is arranged on the first principal surface 5a of the wireless IC chip 5. The second principal surface 5b of the wireless IC chip 5 opposes the support film 10 and the power supply portion 12 is arranged in the projection plane of the power supply circuit 7 so as to be arranged across the projection plane.

The operational effects of the wireless IC device 1q are similar to those in the first preferred embodiment described above. Particularly, since the power supply circuit 7 does not directly oppose the power supply portion 12 but the power supply circuit 7 opposes the power supply portion 12 at a predetermined distance substantially corresponding to the thickness of the wireless IC chip 5, the wireless IC device 1q has the advantage that the center frequency (f0) of transmission-reception signals is not significantly shifted.

The wireless IC devices according to preferred embodiments of the present invention are not limited to the ones according to the preferred embodiments described above and may be modified within the scope of the present invention.

For example, the detailed internal configuration of the wireless IC chip 5 and the detailed shapes of the radiation plate 11 and the support film 10 may be arbitrarily set. In addition, the wireless IC chip 5 may be fixed on the support film 10 by a method other than an adhesive.

As described above, preferred embodiments of the present invention are useful for a wireless IC device used in a RFID system. Particularly, each wireless IC device of preferred embodiments of the present invention is advantageous because it has a higher antenna gain, it operates at a sufficient distance to a reader-writer, and it can be used even in frequency bands higher than UHF band.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A wireless integrated circuit device comprising:
a wireless integrated circuit chip including a power supply circuit that includes a resonant circuit including at least one coil pattern; and
a radiation plate arranged to externally radiate a transmission signal supplied from the power supply circuit and to supply a reception signal externally transmitted to the power supply circuit; wherein
the radiation plate is coupled to the power supply circuit via a magnetic field;
the radiation plate includes at least one radiation portion arranged to externally exchange a transmission-reception signal and a power supply portion arranged to exchange a transmission-reception signal with the power supply circuit;
the power supply portion is arranged such that at least a portion thereof extends across a projection plane of the at least one coil pattern and an area of the power supply portion within the projection plane of the at least one coil pattern is less than an area of the projection plane of the at least one coil pattern; and
the projection plane of the at least one coil pattern included in the power supply circuit is arranged so as to overlap with the power supply portion of the radiation plate, and the projection plane extends over at least one outer edge of the power supply portion.

2. The wireless integrated circuit device according to claim 1, wherein a longitudinal length of the power supply portion extends across the projection plane of the power supply circuit.

3. The wireless integrated circuit device according to claim 1, wherein the at least one radiation portion includes a plurality of radiation portions that are provided at opposed sides of the power supply portion.

4. The wireless integrated circuit device according to claim 1, wherein the at least one radiation portion is provided at only one end of the power supply portion.

5. The wireless integrated circuit device according to claim 1, wherein a plurality of power supply circuits are provided on the wireless integrated circuit chip and the power supply portion is arranged so as to be positioned between projection planes of the plurality of power supply circuits.

6. The wireless integrated circuit device according to claim 5, wherein the power supply portion is arranged such that a longitudinal length thereof extends across the projection planes of the plurality of power supply circuits.

7. The wireless integrated circuit device according to claim 1, wherein the radiation plate is arranged substantially in an x-y plane.

8. The wireless integrated circuit device according to claim 7, wherein the radiation plate includes radiation portions extending substantially in an x-axis direction and a y-axis direction.

9. The wireless integrated circuit device according to claim 1, wherein the radiation plate includes radiation portions extending substantially in an x-axis direction, a y-axis direction, and a z-axis direction in an x-y-z plane.

10. The wireless integrated circuit device according to claim 1, wherein an area of a projection plane of the power supply portion is substantially equal to or greater than an area of a projection plane of the power supply circuit.

11. The wireless integrated circuit device according to claim 1, wherein the radiation portion extends in a direction substantially perpendicular to a plane on which the power supply circuit is arranged.

12. The wireless integrated circuit device according to claim 1, wherein the power supply portion and the power supply circuit are covered with a magnetic body.

13. The wireless integrated circuit device according to claim 1, wherein an electrical length of the radiation plate is substantially an integral multiple of a half wavelength of the transmission-reception signal.

14. The wireless integrated circuit device according to claim 1, wherein the radiation plate is made of a flexible metal film.

15. The wireless integrated circuit device according to claim 14, wherein the metal film is supported by a flexible film.

* * * * *